United States Patent
Frederiksen et al.

(10) Patent No.: US 8,473,234 B2
(45) Date of Patent: Jun. 25, 2013

(54) METHOD AND DETECTION ASSEMBLY FOR THE DETECTION OF CHANGES IN A BUILDING STRUCTURE OF A WIND TURBINE

(75) Inventors: Dan Frederiksen, Haderslev (DK); Hans Laurberg, Arhus C. (DK)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 13/515,381

(22) PCT Filed: Oct. 7, 2010

(86) PCT No.: PCT/EP2010/065014
§ 371 (c)(1),
(2), (4) Date: Aug. 6, 2012

(87) PCT Pub. No.: WO2011/072901
PCT Pub. Date: Jun. 23, 2011

(65) Prior Publication Data
US 2012/0323543 A1 Dec. 20, 2012

(30) Foreign Application Priority Data
Dec. 18, 2009 (EP) ..................................... 09015735

(51) Int. Cl.
*G01R 23/00* (2006.01)
*G06F 19/00* (2011.01)

(52) U.S. Cl.
USPC .................. 702/75; 415/1; 415/119; 702/106

(58) Field of Classification Search
USPC ............ 702/56, 57, 189, 75, 106, 130; 415/1, 415/118, 119
See application file for complete search history.

(56) References Cited

U.S. PATENT DOCUMENTS 7,980,814 B2 * 7/2011 Nieuwenhuizen ............ 415/119
8,226,347 B2 * 7/2012 Bywaters ......................... 415/1

FOREIGN PATENT DOCUMENTS

| DE | 102005031436 A1 | 1/2007 |
| WO | WO 2008000265 A1 | 1/2008 |

* cited by examiner

*Primary Examiner* — John H Le

(57) ABSTRACT

A method for detecting changes in a building structure of a first wind turbine is provided. A reference value representing the eigenfrequency of the first wind turbine is monitored over time, whereby substantial changes in the reference value are used as an indication of changes in the building structure. Further, a detection assembly for such detections is provided.

12 Claims, 2 Drawing Sheets

METHOD AND DETECTION ASSEMBLY FOR THE DETECTION OF CHANGES IN A BUILDING STRUCTURE OF A WIND TURBINE

CROSS REFERENCE TO RELATED APPLICATIONS

This application is the US National Stage of International Application No. PCT/EP2010/065014 filed Oct. 7, 2010, and claims the benefit thereof. The International Application claims the benefits of European Patent Application No. 09015735.5 EP filed Dec. 18, 2009. All of the applications are incorporated by reference herein in their entirety.

FIELD OF INVENTION

The present invention concerns a method for the detection of changes in a building structure of a first wind turbine. It also concerns a detection assembly for that purpose.

BACKGROUND OF INVENTION

Changes in the building structure of wind turbines need to be monitored thoroughly as they indicate possible risks for the operation and safety of a wind turbine. Such changes comprise for instance damages to the tower of the wind turbine such as dents or developments of cracks or the like and the loss of pretensions in bolt assemblies within the wind turbine structure, in particular in the tower of the wind turbine. Furthermore it also concerns changes in the foundation which may be caused by earthquakes, erosion of the surrounding sand in an offshore foundation or cracks in the foundation. Other possible changes may occur in monopile foundations of wind turbines offshore. Other examples of changes in the wind turbine structure relate to yaw bearing problems and ice on the wind turbine. Most of these changes constitute a considerable risk for the wind turbine.

Monitoring such changes reliably is therefore an important task in order to avoid further damages and to make sure that the wind turbine has a long lifetime. So far detecting and tracking the changes in wind turbine structures is mainly done with non-automatic means. The wind turbines have to be inspected by staff on a regular basis and tests, for instance manual tests, have to be carried out at the site of the wind turbines in order to make sure that changes in their structure are found early enough to prevent further damage.

SUMMARY OF INVENTION

It is an object of the invention to provide an easier detection, preferably automatically, of such changes in building structures of wind turbines.

This object is met by a method and by a detection assembly according to the

According to the invention, the method of the above mentioned kind is realised by monitoring a reference value representing the eigenfrequency of the first wind turbine over time and by using substantial changes in the reference value as an indication of changes in the building structure.

In other words, use is made of the fact that changes in the building structure of wind turbines have a clear influence on the eigenfrequency of the wind turbine, in particular of the tower of the wind turbine. Thus, a so-called reference value is monitored which represents directly or indirectly the eigenfrequency of the wind turbine. If that reference value changes significantly within a short period of time, this is an indication of a change in the wind turbine structure. But also if this representative reference value changes slowly over time, this may be due to potentially dangerous changes in the structure which build up more slowly than very acute ruptures or the like.

As for the definition of eigenfrequency, it may be understood that this includes any resonant frequency of the building structure, i.e. also higher order resonance frequencies or a middle value of resonant frequencies. The eigenfrequency can thus also be considered such frequency of the wind turbine (in particular of the tower) that brings about a resonant effect in an ideal state of the wind turbine, i.e. under the assumption that any additional influences on the frequency from outside can be filtered out.

The problem with monitoring the eigenfrequency of a wind turbine is the fact that the frequency of the wind turbine at one particular given time is highly dependent on influences from the outside. For instance, the operation mode of the wind turbine (rotation speed, vibrations within the nacelle of the wind turbine etc.), and weather conditions, in particular wind and temperature conditions, but also operational factors (rotor speed, pitch position, power production) are important factors which influence the current frequency of the wind turbine. Therefore, using a current frequency of a wind turbine in order to monitor changes of the wind turbine structure is not enough on its own. The reference value used for monitoring and therefore preferably comprises such factors which essentially level current operation and weather factors. The result is a normalised frequency curve which gives a much clearer indication of the state of the wind turbine structure over a longer monitoring time.

According to the invention, a detection assembly of the above-mentioned kind comprises at least the following components:
reference value unit for output of a reference value representing the eigenfrequency of the first wind turbine,
a monitoring unit which in operation monitors the reference value over time,
and a change indication unit that indicates in operation a change in the building structure if substantial changes in the reference value occur.

Such a reference value unit may be a calculation unit which derives from input signals the reference value mentioned above or may be an interface via which such reference value can be put into the detection assembly for further processing.

Any of the components of the detection assembly, in particular the reference value unit, the monitoring unit and the change indication unit, may each and possibly all of them be realized as software components on a processor, but also as hardware components or as a combination thereof.

Therefore, the invention also concerns a computer programme product directly loadable into a memory of a programmable device comprising software code portions for performing the steps of a method according to the invention when said product is run on the programmable device.

Further, the invention also concerns a wind turbine equipped with a detection assembly according to the invention and also a wind park with several wind turbines comprising at least one first wind turbine according to the invention.

Particularly advantageous embodiments and features of the invention are given by the dependent claims, as revealed in the following description. Thereby, features revealed in the context of the method may also be realized in the context of the detection assembly and/or the wind turbine and/or the wind park and vice versa.

Preferably, the reference value is based on a difference between a frequency value representing a current frequency of the first wind turbine and a modelled frequency behaviour value. The current frequency of the first wind turbine can be a mean frequency of the first wind turbine at a given time. That means that the frequency of the first wind turbine is monitored over a certain period of time such as one minute in order to level peaks of the frequency which may for example be caused by sudden wind blasts or a short time during which the wind turns. Both factors influence the vibrations of the wind turbine so that non-representative peaks or lowest values of the frequency can be caused. Using a mean frequency instead as the current frequency value instead of a frequency at one given time only thus levels these peaks and lowest values and gives a better representation of the frequency of the first wind turbine. The frequency value gives an indication of the frequency of the wind turbine, respectively the wind turbine tower, at a particular given time.

Putting this frequency value into the context of a model value means that the reference value represents the difference between what frequency can actually be measured and what frequency would be expected to be measured. Thereby, the modelled frequency behaviour value may comprise factors which represent influences on the tower by the environment at that very given time. Therefore, the modelled frequency behaviour value is not necessarily static but preferably a flexible value dependent on a current input of data, in particular weather data.

With "errorSig" being the reference value, "towerFreq" being the current frequency value and "towerFreq_Model" being the modelled frequency behaviour value, the equation to calculate the reference value is the following:

$$\text{errorSig} = \text{towerFreq} - \text{towerFreq\_Model}$$

In this context it is particularly preferred that the modelled frequency behaviour value is modelled using a temperature value representing a current temperature in an environment of the first wind turbine. The changes in the tower eigenfrequency due to for instance cracks are smaller than the natural changes in the tower frequency. Therefore, using representative values for the natural changes in the tower frequency as factors to be subtracted from the current frequency value makes sure that these influences are not taken into account during monitoring of the eigenfrequency of the wind turbine.

In this context the inventors have found out that the temperature constitutes a very important factor which influences the current frequency of a wind turbine tower. In fact, the temperature is the most important factor which cannot be levelled in a calculation by simple means of calculating a mean current frequency as described above. Therefore, it is particularly advantageous to take into account the temperature factor. The temperature value preferably represents the ambient temperature of the wind turbine as opposed to the inside temperature, for instance within the nacelle of the wind turbine. Nevertheless, sensors for measuring the temperature can be placed both inside and outside the wind turbine, however the former with a preference of being directed to the outside. Possible locations of the temperature sensors are anywhere within the tower of the wind turbine, in its nacelle, outside the nacelle on nacelle level, outside the wind turbine in close proximity to the ground level, and within a wind park anywhere in between the single wind turbines of the wind park.

Although the temperature has been proven to be of a very high importance (which accounts for about half of the variance in tower frequency), other factors such as weather factors or influences such as the water depth of the wind turbine tower in an offshore environment may be taken into account in the calculations.

A particularly suitable way of how to calculate the modelled frequency behaviour value is by multiplying the current temperature value with a first specific constant and by adding to this product a second specific constant. With "temp" being the temperature value $c_1$ being the first specific constant and $c_2$ the second specific constant, the equation for the modelled frequency behaviour is thus:

$$\text{towerFreq\_model} = c_1 \times \text{temp} + c_2$$

Thus, the full equation to calculate the reference value is:

$$\text{errorSig} = \text{towerFreq} - c_1 \times \text{temperature} - c_2$$

This calculation model is particularly advantageous as it is simple to use and as it is based on a strictly linear model. However, non-linear models, i.e. adaptive models may be used as well.

In the context of this particular calculation model it is particularly preferred that the first specific constant represents a mean frequency of the first wind turbine and/or a frequency value related to a specific type of wind turbine to which the first wind turbine belongs and/or that the second specific constant represents a constant specific for the first wind turbine.

It has been found out by the inventors that the first specific constant, i.e. the one which is multiplied with the temperature value, can often be derived from specific types of wind turbines and used for all wind turbines of that kind. This allows for a certain degree of generalization within the calculation, no matter which wind turbine of the same type within a group of wind turbines one wants to monitor. A mean frequency of the first wind turbine is preferably used as the first specific constant. It can be modelled or measured at an initial stage of use of the wind turbine for instance. At any event, the first constant is an ideal representation of how the first wind turbine "should" behave in terms of frequency. The second constant is preferably derived from measurements or simulations or a combination thereof with respect to the very wind turbine which is monitored. Therefore it is a specific constant for the first wind turbine. It represents a temperature compensation value which is normally unique for each individual wind turbine.

By simply deriving the first constant from frequency values or databases, by measuring the temperature regularly and by deriving the second constant from the inspected wind turbine one thus has got all values at hand which are necessary to generate the modelled frequency behaviour value at any given time. Therefore, the modelling procedure is simple once the initial values, i.e. the first and second constants, have been found out.

Very often wind turbines are established in groups of wind turbines such as wind parks offshore with a large multitude of wind turbines. In such context it is a favourable if at least one of the first specific constant and the second specific constant is the same constant as used in the context of a detection of changes in the building structure of a second wind turbine in close proximity to the first wind turbine, preferably of all wind turbines assembled in a group of wind turbines which group comprises the first wind turbine. In particular the first specific constant—as outlined above—can be used on such a general basis if all wind turbines for which this constant is used are of the same type—and often even if they are of a similar type. In some cases even the second specific constant may be applied for use of monitoring several wind turbines of the same type. Using the same constants (at least selectively) helps to reduce calculation effort and costs at the initial stage of the monitoring process.

The reference value may be any figure that can be thought of. In order to simplify the detection of changes to the wind turbine structure the reference value can comprise a classifier indicating a state of alarm and a state of normal eigenfrequency of the first wind turbine. In this context the classifier can also include a temperature value as a factor. For instance the classifier can be zero for a normal state and one for a state of alarm, i.e. if the reference value is above or below a certain maximum or minimum threshold. However, for instance depending on the temperature value, the classifier can also be a more differentiated figure representing certain alarm and/or temperature stages (based on a larger number of thresholds). The classifier can also be presented to the user by means of graphical descriptive indications such as different colours for different alarm levels (green, yellow and red) or indications of a percentage of estimated reliability of the wind turbine structure.

The frequency value as well as the temperature value can be derived by at least three different methods: according to a first variant, the frequency value and/or the temperature value is measured by a number of sensors. These sensors are preferably situated inside a nacelle of the first wind turbine or attached to the outside of the nacelle. This implies that the frequency value and/or the temperature value are taken by individual sensors which are at least in close proximity of the wind turbine and which monitor these values very precisely due to this closeness to the wind turbine. According to a second variant the temperature value may also be derived from a database of representative temperature values relating to similar circumstances in time and/or weather conditions as is currently the case. For instance, in areas with weather which can easily be predicted such as in desserts where the temperature curve is virtually the same every day, it is enough to use the information about the current time in order to derive therefrom a certain expected temperature value. Thus, instead of measuring the temperature recurring to a database in which couples of values of daytime and expected temperature value are stored may completely suffice. Certainly the first and second variant may be combined in the sense of using time and/or weather conditions in order to determine the temperature value and using a sensor in order to determine the frequency value.

The first variant may also be, but need not necessarily be, combined with a third variant concerning the frequency value. This value can also be derived from current frequencies of a number of wind turbines within a wind turbine park comprising a group of wind turbines. In such case the frequency value is preferably the mean value of the frequencies of the number of wind turbines, preferably of all wind turbines within the group of wind turbines.

Similarly, the modelled frequency behaviour value of the first wind turbine can be derived from the current frequency values of a number of wind turbines to which the first wind turbine belongs. In such case with a number of N wind turbines in the equation for calculating the modelled frequency behaviour value is:

$$\text{towerFreq\_model} = (\text{towerFreq\_1} + \text{towerFreq\_2} + \ldots + \text{towerFreq\_N})/N$$

with towerFreq_1, towerFreq_2 and towerFreq_N being there current frequency values of a first wind turbine, a second wind turbine and the last wind turbine in a number of N wind turbines.

For this modelling no temperature value needs to be taken and thus no temperature measurements need to be done. The more wind turbines there are within the group of wind turbines the more exactly will the results be of this calculation in order to find out changes in the building structure of one particular wind turbine. This kind of modelling is based on the presumption that wind turbines within one wind park or within one group operate under relatively equal conditions concerning wind speed and temperature and that it is therefore possible to detect if the frequency of one particular wind turbine starts to differ from the others.

The detection assembly can therefore also be realized such that it receives in operation a number of frequency values of wind turbines and/or a number of temperature values and which derives therefrom a mean frequency value and/or a mean temperature value.

A wind turbine according to the invention preferably further comprises
   a frequency measurement sensor which measures a current frequency of the wind turbine and/or a frequency calculation unit which derives the frequency value from current frequencies of a number of wind turbines within a group of wind turbines,
   a temperature measurement sensor which measures a current temperature value or a temperature value derivation unit which in operation derives a temperature value from a database of representative temperature values relating to similar circumstances in time and/or weather conditions as is currently the case.

As can be seen, instead of a frequency measurement sensor a frequency calculation unit can be used if a group of wind turbines is taken into consideration and instead of a measured temperature measurement sensor a temperature value derivation unit can extract temperature values from a database as described above in detail.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like reference numbers refer to like objects throughout. Objects in the diagrams are not necessarily drawn to scale.

DETAILED DESCRIPTION OF INVENTION

Figure 1:
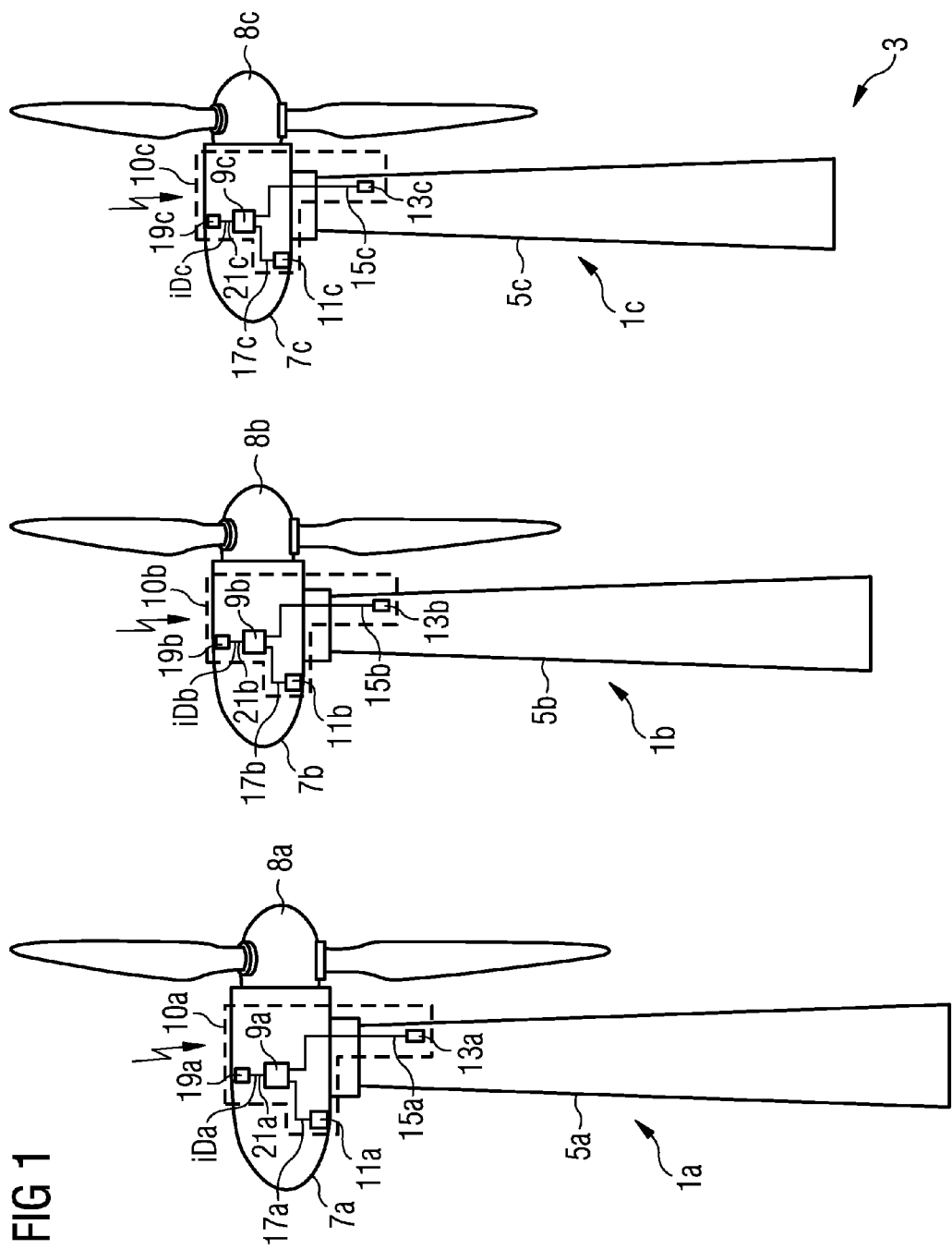
FIG. 1 shows a schematic perspective view of a wind park with a number of wind turbines according to an embodiment of the invention.

FIG. 1 shows a wind park with a group 3 of wind turbines 1a, 1b, 1c. Each wind turbine 1a, 1b, 1c comprises a tower 5a, 5b, 5c, and a nacelle 7a, 7b, 7c. Rotors 8a, 8b, 8c are attached to the nacelles 7a, 7b, 7c. In each of the towers 5a, 5b, 5c there is installed a frequency measurement sensor 13a, 13b, 13c. To each of the nacelles 7a, 7b, 7c at their outside there is attached a temperature sensor 11a, 11b, 11c. A wireless communication unit 19a, 19b, 19c is installed on each of the nacelles 7a, 7b, 7c to send data to a monitoring centre (not shown) in which alarm signals are generated and displayed to users. Such alarm signals include information about relevant changes in the eigenfrequency of the wind turbines $1a$, $1b$, $1c$, in particular of their towers $5a$, $5b$, $5c$. The information data are received from a detection assembly $9a$, $9b$, $9c$. The detection assembly $9a$, $9b$, $9c$ is connected via data connections $15a$, $17a$, $21a$, $15b$, $17b$, $21b$, $15c$, $17c$, $21c$ to the sensors $11a$, $13a$, $11b$, $13b$, $11c$, $13c$ and to the wireless units $19a$, $19b$, $19c$.

The first wind turbine $1a$ can be used as an example of how the invention works according to an embodiment. In order to monitor changes in the structure of the first wind turbine $1a$ a reference value referring to the eigenfrequency of the wind turbine $1a$, in particular to the eigenfrequency of the tower $5a$ is monitored. This reference value is derived in the detection assembly $9a$. For that purpose the detection assembly $9a$ receives signals from the sensors $11a$, $13a$ namely temperature values and frequency values representing the current frequency of the wind turbine $1a$. From these data the detection assembly $9a$ derives information data about changes of the wind turbine structure.

Figure 2:
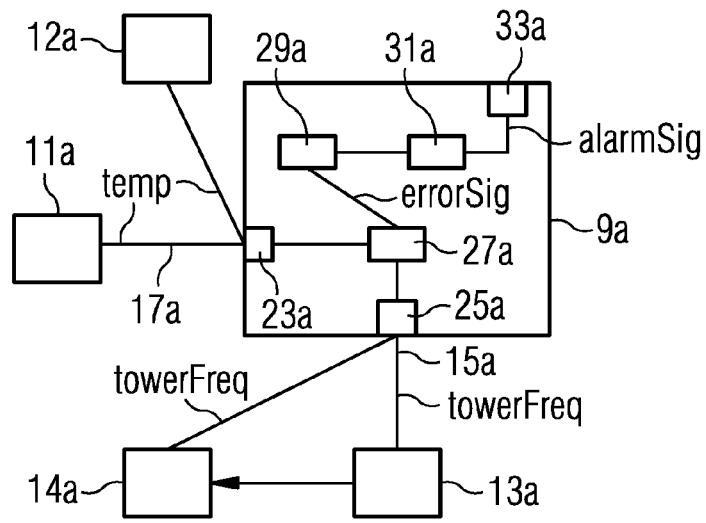
FIG. 2 shows a block view of the detection assembly of FIG. 1.

FIG. 2 shows a block view of the detection assembly $9a$. It comprises a first input interface $23a$ and a second input interface $25a$. From these two interfaces $23a$ and $25a$ temperature values temp and frequency values towerFreq are introduced into the detection assembly $9a$.

The detection assembly $9a$ further comprises a reference value unit $27a$, a monitoring unit $29a$ and a change indication unit $31a$ all of which are realized as software units on a processor of the detection assembly $9a$. The reference value unit $27a$ generates from the current frequency value towerFreq a reference value errorSig which represents the eigenfrequency of the first wind turbine $1a$, whereas the monitoring unit $29a$ monitors this reference value errorSig. If a significant change of the reference value errorSig occurs, the change indication unit $31a$ indicates this as a change in the building structure of the first wind turbine $1a$ in the form of an alarm signal alarmSig. Such alarm signal alarmSig is put out via an output interface $33a$ and further via the wireless unit $19a$.

It may be noted that FIG. 2 shows two alternative possibilities of input of temperature values temp and modelled frequency values towerFreq_Mod. Firstly, concerning the temperature values temp, it is possible to use the temperature sensor $11a$ as shown in FIG. 1. Alternatively, a temperature value derivation unit $12a$ can be used which derives from current weather data and/or from data referring to the current daytime certain temperature values temp. As outlined above, such database-based solution can be used as an alternative or as an add-on to temperature measurement.

As for the current frequency values towerFreq, they can be measured by means of the frequency measurement sensor $13a$ as shown in FIG. 1. In addition, the modelled frequency behaviour values towerFreq_Mod can be calculated by a wind turbine frequency calculating unit $14a$—which may also be incorporated in the detection assembly $9a$. For this purpose, frequency measurements of all frequency measurement sensors $13a$, $13b$, $13c$ are combined to a mean frequency value of the wind park. Instead of using a temperature value temp as an additional input to receive the reference value errorSig, this mean frequency value of the wind park can be used as the modelled frequency behaviour value towerFreq_Mod and is subtracted from the current frequency value towerFreq of the first wind turbine $1a$.

Figure 3:
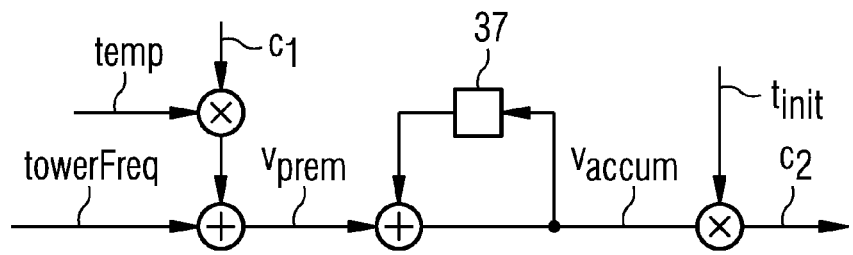
FIG. 3 shows a flow chart of a calibration stage for initiating a method according to an embodiment of the invention.

FIG. 3 shows how within the detection assembly $9a$ the logic of the monitoring procedure is initially established. A temperature value temp is measured by the temperature sensor $11a$ and is multiplied with the first specific constant $c_1$. This specific constant $c_1$ is specific for a type of wind turbine, i.e. it represents the mean wind turbine frequency of this type of wind turbine to which the first wind turbine $1a$ belongs. At the same time the frequency measurement sensor $13a$ measures the current frequency value towerFreq of the first wind turbine $1a$. Alternatively, the current frequency value towerFreq may also be estimated based on modelling presumptions. The current frequency value towerFreq is added to the product of the first specific constant $c_1$ and the temperature value temp so that a preliminary value $v_{prem}$ is generated. In order to refine the result of the calibration process, this procedure is carried out several times and all generated preliminary values $v_{prem}$ are added together in an addition unit $37$. The accumulated preliminary values $v_{acuum}$ are then divided by the number of preliminary values $v_{prem}$ taken which is a function of the initiation time $t_{init}$ used for the calibration process. The result of this addition is the second specific constant $c_2$ which will be used further within a monitoring process according to the invention.

Figure 4:
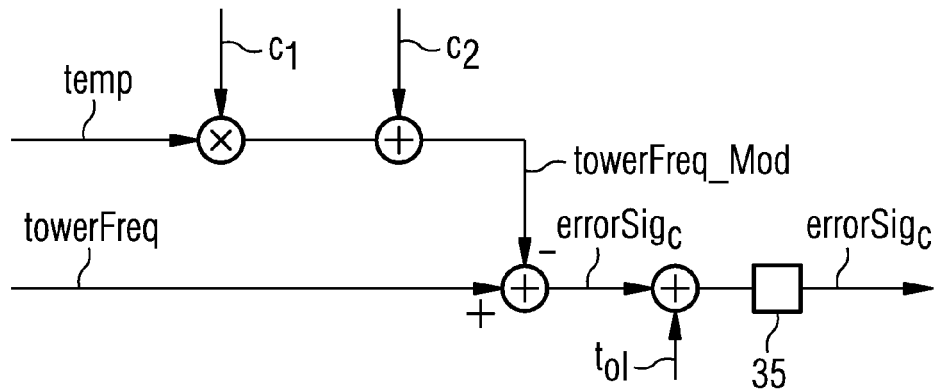
FIG. 4 shows a flow chart of a monitoring stage employing this embodiment of the invention for which the calibration of FIG. 3 has been made.

FIG. 4 shows this monitoring process according to one preferred embodiment of the invention. Again, a temperature value temp is multiplied by the first specific constant $c_1$ to which products there is added the newly generated second specific constant $c_2$. The result of this calculation is the modelled frequency behaviour value towerFreq_Mod. The frequency measurement sensor $13a$ measures the current frequency value towerFreq of the first wind turbine $1a$. From this current frequency value towerFreq there is subtracted the modelled frequency behaviour value towerFreq_Mod which results in a reference value errorSig. To this there is added a tolerance figure to1 and the result of this is evaluated in an evaluation unit $35$ which classifies it. Thus a classified reference value $errorSig_c$ is generated. This classified reference value $errorSig_c$ gives an indication if the frequency of the first wind turbine $1a$ is within the range that appears to be acceptable or whether there are indications of changes and thus possible damages to the structure of the wind turbine $1a$.

As indicated above, the procedure described in the context of FIGS. 3 and 4 refers to just one embodiment of the invention which takes into consideration the current temperature value temp. A different modelling procedure implies the calculation of a mean tower frequency in a wind park, as has been discussed in the context of FIG. 2.

Although the present invention has been disclosed in the form of preferred embodiments and variations thereon, it will be understood that numerous additional modifications and variations could be made thereto without departing from the scope of the invention. In particular the ways of how to arrive at the reference value can be manyfold, as well as the possible ways of modelling a modelled frequency behaviour value.

For the sake of clarity, it is to be understood that the use of "a" or "an" throughout this application does not exclude a plurality, and "comprising" does not exclude other steps or elements.

The invention claimed is:

1. Method for detecting changes in a building structure of a wind turbine, comprising:
   monitoring a reference value representing the eigenfrequency of a wind turbine over time using a monitoring unit,
   providing the reference value by a reference value unit, and
   using changes of the reference value as an indication of changes in a building structure of the wind turbine,
      wherein a change indication unit indicates the changes in the building structure of the wind turbine, and
      wherein the reference value is based upon a difference between a frequency value representing a current frequency of the wind turbine and a modelled frequency behaviour value.

2. The method according to claim 1, wherein the modelled frequency behaviour value is modelled using a temperature value representing a current temperature in an environment of the wind turbine.

3. The method according to claim 2, wherein the modelled frequency behaviour value is calculated such that the current temperature value is multiplied with a first specific constant, and wherein a second specific constant is added to a product of the current temperature value multiplied with the first specific constant.

4. The method according to claim 3, wherein the first specific constant represents a mean frequency of the wind turbine and/or a frequency value related to a specific type of wind turbine to which the wind turbine belongs and/or wherein the second specific constant represents a constant specific for the first wind turbine.

5. The method according to claim 3, wherein at least one of the first specific constant and the second specific constant is a same constant as used in a context of a detection of changes in the building structure of a further wind turbine in close proximity to the wind turbine, preferably of all wind turbines assembled in a group of wind turbines which group comprises the wind turbine.

6. The method according to claim 2, wherein the frequency value and/or the temperature value is measured by a plurality of sensors arranged inside a nacelle of the wind turbine or attached to the outside of the nacelle.

7. The method according to claim 2, wherein the temperature value is derived from a database of representative temperature values relating to similar circumstances in time and/or weather conditions as is currently the case.

8. The method according to claim 1, wherein the reference value comprises a classifier indicating a state of alarm and a state of normal eigenfrequency of the wind turbine.

9. The method according to claim 1, wherein the frequency value is derived from current frequencies of a plurality of wind turbines within a wind turbine park.

10. The method according to claim 9, wherein the frequency value is a mean value of the frequencies of the plurality of wind turbines within the wind turbine park.

11. Detection assembly for detecting changes in a building structure of a wind turbine, comprising:
  a reference value unit for output of a reference value representing the eigenfrequency of a wind turbine,
  a monitoring unit which monitors the reference value over time, and
  a change indication unit which indicates a change in a building structure when the reference value changes,
  wherein the reference value is based upon a difference between a frequency value representing a current frequency of the wind turbine and a modelled frequency behaviour value.

12. Wind turbine with a detection assembly according to claim 11, comprising:
  a frequency measurement sensor which measures the current frequency of the wind turbine,
  and/or
  a frequency calculation unit which derives the frequency value from current frequencies of a plurality of wind turbines within a group of wind turbines, and
  a temperature measurement sensor which measures a current temperature value, or a temperature value derivation unit which derives a temperature value from a database of representative temperature values relating to similar circumstances in time and/or weather conditions.

* * * * *